United States Patent [19]
Jones et al.

[11] Patent Number: 5,691,518
[45] Date of Patent: Nov. 25, 1997

[54] SLIDING TRIGGER INTERLOCK AND SECONDARY DISCONNECT CONTACTS FOR DRAWOUT SWITCHES

[75] Inventors: Murray K. Jones, Johnsonville; Terry A. Jernigan, Florence, both of S.C.

[73] Assignee: ABB Power T&D Company Inc., Raleigh, N.C.

[21] Appl. No.: 552,519

[22] Filed: Oct. 13, 1995

[51] Int. Cl.[6] .................................................. H01H 9/20
[52] U.S. Cl. ............................. 200/50.21; 200/50.26; 361/607
[58] Field of Search ................ 200/50.01, 50.2–50.27, 200/43.11–43.22; 361/605, 607, 609, 615

[56] References Cited

U.S. PATENT DOCUMENTS

| | | | |
|---|---|---|---|
| 3,188,415 | 6/1965 | Netzel | 200/50.24 |
| 4,020,301 | 4/1977 | Ericson | 200/50.26 |
| 4,139,748 | 2/1979 | Wolfe et al. | 200/50.26 |
| 4,236,189 | 11/1980 | Yosida | 361/337 |
| 4,395,602 | 7/1983 | Castonguay | 200/50.22 |
| 4,565,908 | 1/1986 | Bould | 200/50.22 |
| 4,743,715 | 5/1988 | Gerbert-Gaillard et al. | 200/50.26 |
| 4,761,521 | 8/1988 | Beck et al. | 200/50.21 |
| 5,043,541 | 8/1991 | Kraft | 200/50.26 |
| 5,434,369 | 7/1995 | Tempco et al. | 200/50.26 |

*Primary Examiner*—J. R. Scott
*Attorney, Agent, or Firm*—Woodcock Washburn Kurtz Mackiewicz & Norris LLP

[57] ABSTRACT

An automotive secondary disconnect mechanism for a removable circuit device is disclosed. According to a preferred embodiment, the disconnect mechanism comprises a guide bar, a slide block mounted on the guide bar and means for locking the slide block in place on the guide bar, for releasing the slide block from its locked position, for enabling the slide block to move relative to the guide bar, for latching the removable element to the slide block, and for preventing the removable element from engaging the slide block all as the removable element is moved among first, second and third positions.

22 Claims, 9 Drawing Sheets

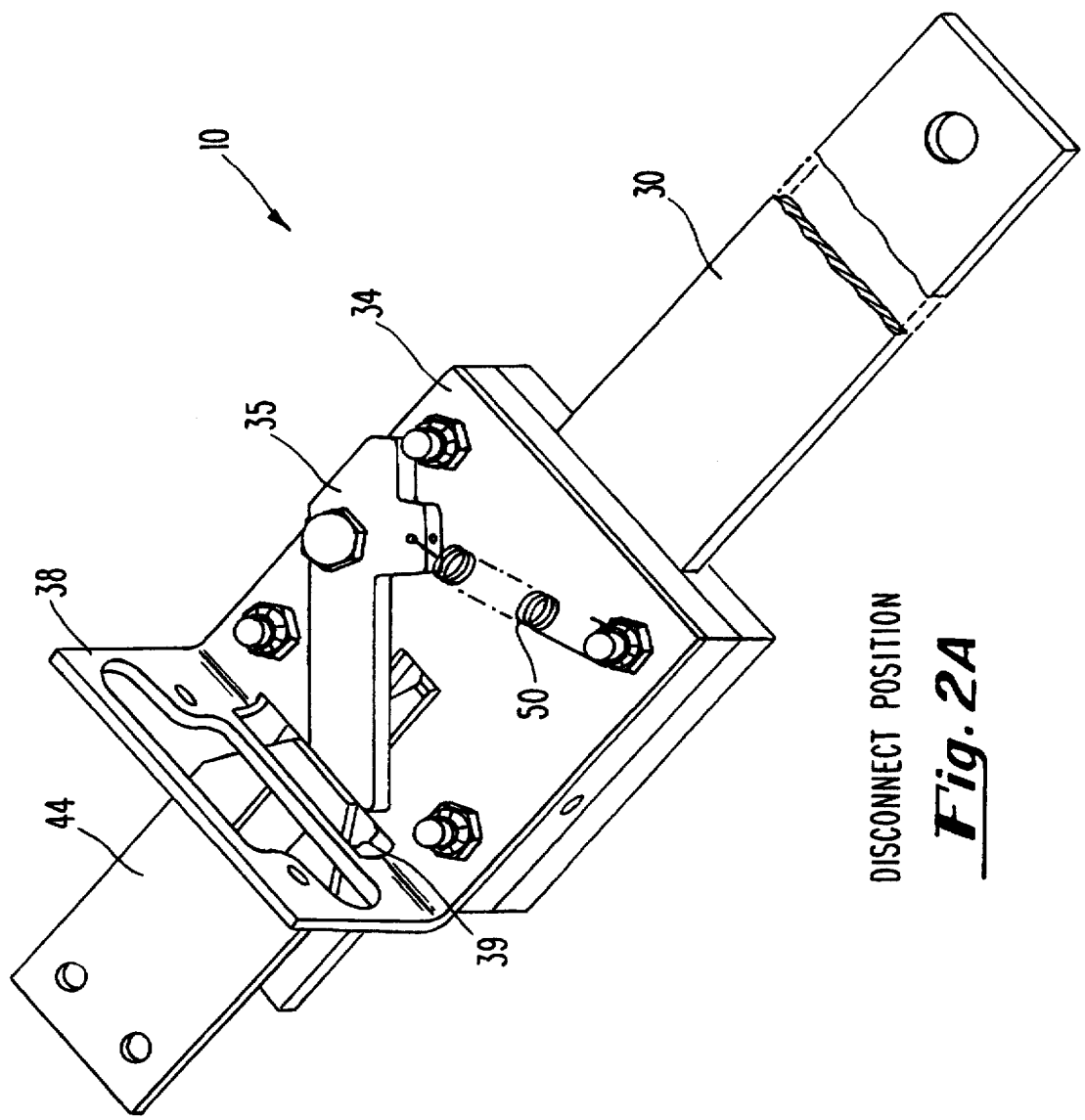

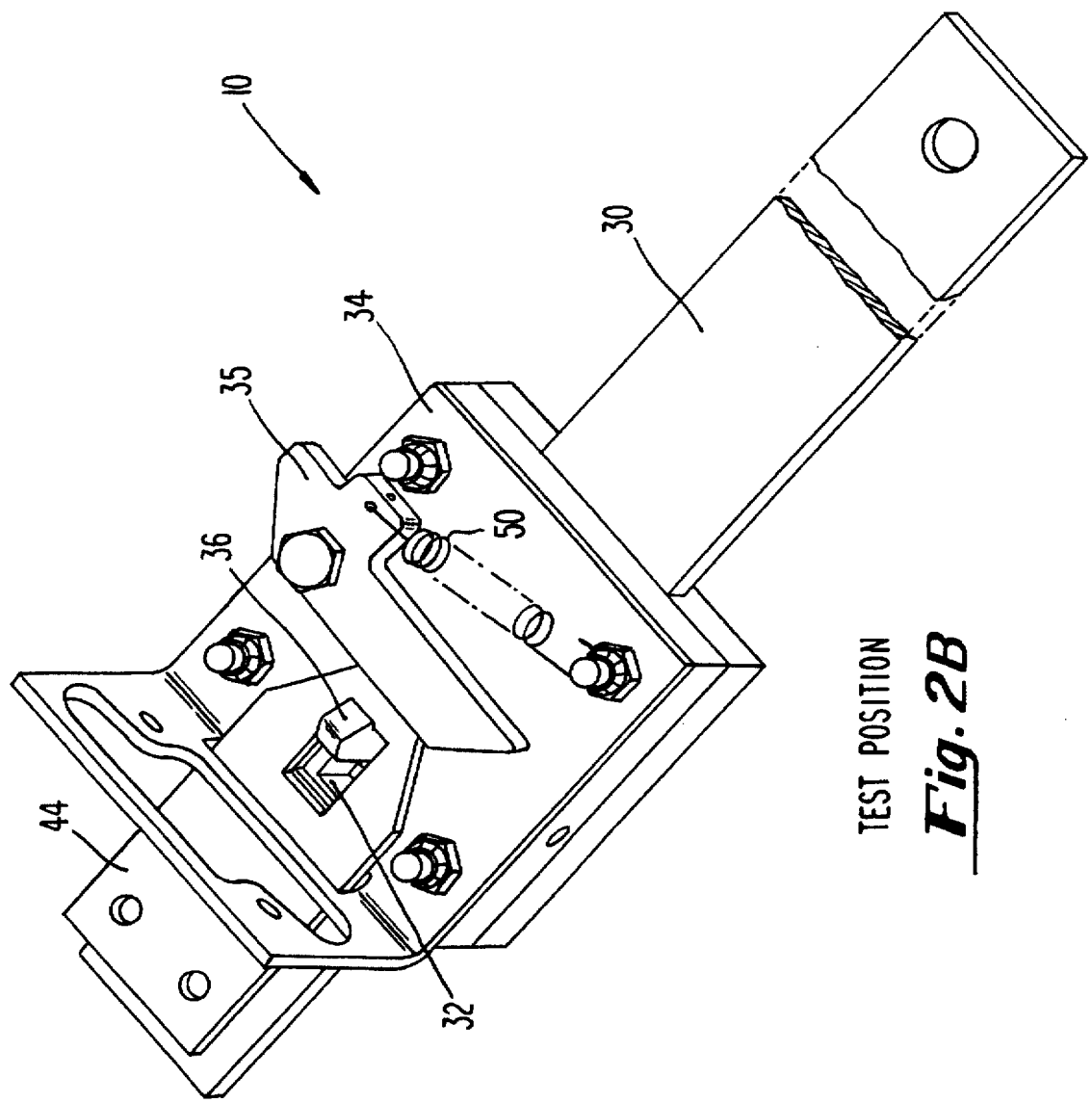
TEST POSITION Fig. 2B

CONNECT POSITION

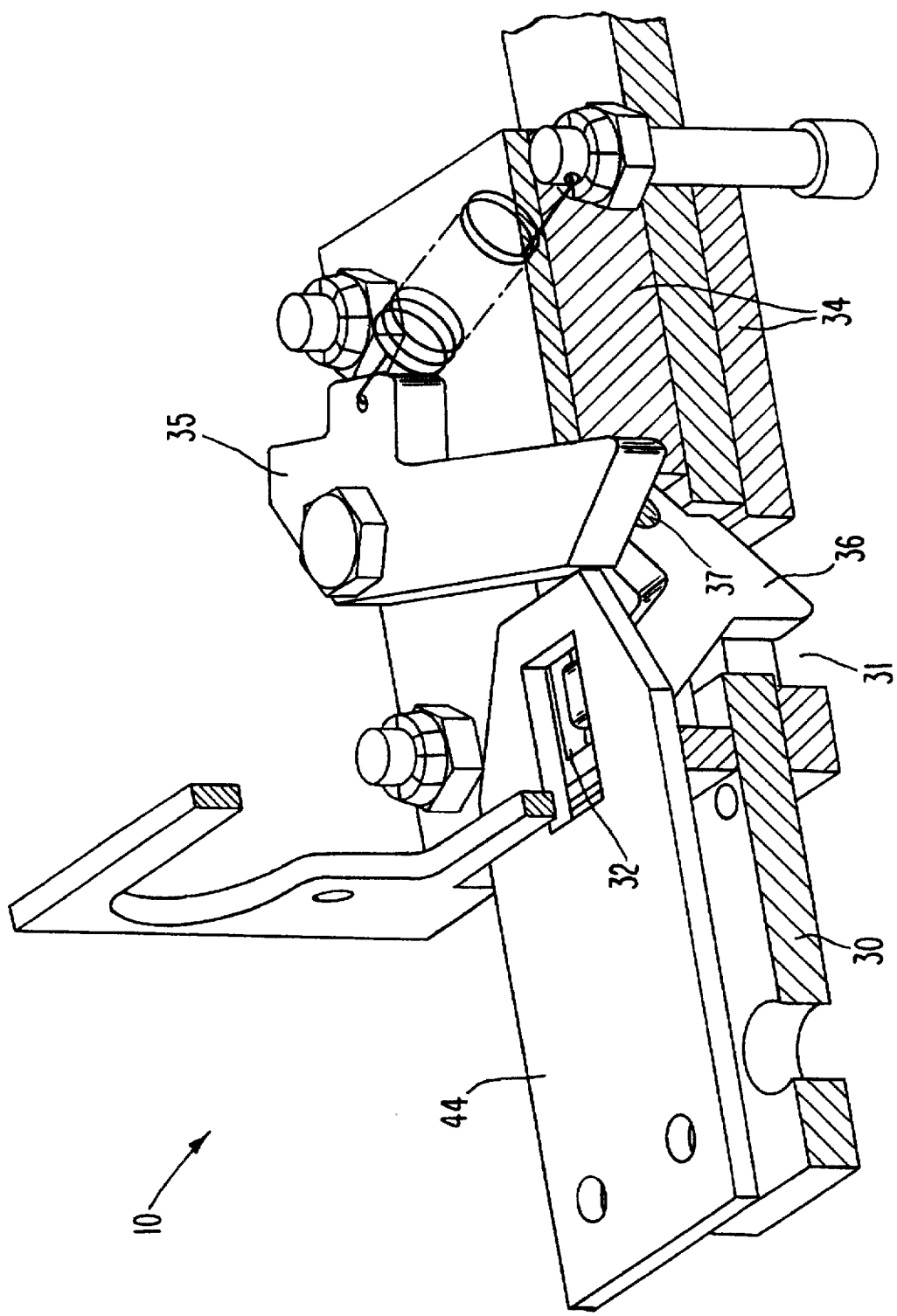

SLIDING TRIGGER INTERLOCK AND SECONDARY DISCONNECT CONTACTS FOR DRAWOUT SWITCHES

The present invention relates generally to automatic interlocking mechanisms, and more particularly, to an automatic secondary disconnect mechanism for a removable circuit device.

BACKGROUND OF THE INVENTION

Circuit breakers for medium voltage switchgear applications, or circuit devices in general, are typically housed in a metal enclosure and are removable. So-called "drawout" apparatus are used to move the circuit breakers between a disconnect position, in which the primary contacts of the circuit breaker are fully disengaged from the mating primary contacts within the enclosure, and a connect position in which the primary contacts of the circuit breaker and enclosure are fully engaged. A racking mechanism is usually employed to ensure steady movement and proper alignment of the circuit breaker as it moves between the disconnect and connect positions.

Circuit breakers are typically equipped with a variety of auxiliary electronic devices and related control circuitry, including switches, motors, solenoids and the like, for providing electronic control of the circuit breaker. For example, automatic operation of the circuit breaker's interrupter contacts may be achieved through the use of such auxiliary devices and control circuitry. Of course, power must be supplied to the auxiliary devices and control circuitry at some point.

Typically, power is provided to the auxiliary devices and control circuitry through mating secondary contacts mounted with the circuit breaker and enclosure. At some point during movement of the circuit breaker from the disconnect position to the connect position, the respective secondary contacts on the circuit breaker and enclosure must be engaged so that power is provided to the auxiliary devices and control electronics. Upon removal of the circuit breaker, the secondary contacts must be disengaged. Additionally, it is common to provide a test position between the connect and disconnect positions of the circuit breaker wherein the secondary contacts are engaged, but the primary contacts are not engaged. With the secondary contacts engaged, but the primary contacts disengaged, the auxiliary functions of the circuit breaker can be thoroughly tested in safety while the breaker is "dead". For example, automatic opening and closing of the circuit breaker's interrupter switches can be tested.

It is generally desirable for the secondary contacts to engage as the circuit breaker reaches the test position and to remain engaged as the circuit breaker continues past the test position to the full connect position. Likewise, upon removal of the circuit breaker it is desirable for the secondary contacts to remain engaged as the circuit breaker moves from the connect position back to the test position, but then to disengage as the circuit breaker moves past the test position to the full disconnect position. Mechanisms for connecting and disconnecting the secondary contacts are generally referred to in the art as "secondary disconnects". Although some prior art switchgear apparatus provide a manual secondary disconnect mechanism, it is generally more desirable to provide an automatic secondary disconnect mechanism in which engagement and disengagement of the secondary contacts is incident to the racking movement of the circuit breaker into and out of its enclosure.

Netzel and Ericson et al., U.S. Pat. Nos. 3,188,415 and 4,020,301, respectively, have both tried to meet the aforementioned objectives through the use of a secondary disconnect mechanism wherein the secondary contacts comprise a pair of conductive strips fixedly mounted to the circuit breaker and enclosure in parallel relation. As the circuit breaker moves into the test position, the respective contact strips begin to slide upon each other. As the circuit breaker moves past the test position into the full connect position, the respective contact strips continue to slide against each other, thereby maintaining contact throughout the entire travel of the circuit breaker. When the circuit breaker moves out of the enclosure, the sliding contacts slide off each other. Unfortunately, sliding contacts are subject to increased wear and require more frequent maintenance. Additionally, because proper connection depends upon continuous engagement of the two contacts as they slide over each other, sliding contacts are more likely to fail or falter at some point during movement of the circuit breaker. For these reasons, sliding contacts do not provide an acceptable solution.

Bould and Wolfe et al., U.S. Pat. Nos. 4,565,908 and 4,139,748, both describe secondary disconnect mechanisms wherein one of the secondary contact halves or members is fixedly attached to the circuit breaker, while the mating secondary contact member is slidably mounted to a guide pin attached to the switchgear enclosure. Each mechanism uses a spring to bias the movable contact member against the fixed contact member on the circuit breaker. As the circuit breaker moves into the test position, the spring provides sufficient biasing in the opposite direction to allow the mating contact members to engage. Once engaged, the contact members move together along the guide pin against the biasing of the spring as the circuit breaker continues to the full connect position. When the circuit breaker is withdrawn from the enclosure, the force provided by the spring keeps the connector halves together as the circuit breaker moves back out to the test position. As the circuit breaker continuous past the test position toward the disconnect position, the movable contact member reaches the end of its travel along the guide pin and therefore the two contact members disengage. While use of a spring biased, movable contact member may overcome some of the disadvantages of the sliding contact mechanisms described by Netzel and Ericson et at., the present inventors have found that biasing the movable contact member with a spring is undesirable. Most notably, use of a spring to bias the movable secondary contact member makes it difficult to ensure proper alignment of the secondary contact members upon initial engagement at the test position. Additionally, the spring may impede the racking motion of the circuit breaker.

Other secondary disconnect mechanisms are described in U.S. Pat. Nos. 4,743,715 (Gerbert-Gaillard et al), 4,761,521 (Beck et al.), 4,236,189 (Yosida) and 5,043,541 (Krafft et al.). However, each of these secondary disconnect mechanisms is either too complex to implement efficiently or is not fully automatic. Consequently, there was a need for an automatic secondary disconnect mechanism that was inexpensive, used few moving parts, and overcame the aforementioned limitations and deficiencies of known secondary disconnect mechanisms.

Tempco et at., U.S. Pat. No. 5,434,369, describes a secondary disconnect mechanism that uses contacts slidably mounted within the switchgear enclosure. A slide member moves along a guide bar that is fixed to the switchgear enclosure and extends parallel to the racking motion of the circuit device. When the circuit device is disconnected, the slide member is locked to the guide bar with spring biased arms that engage slots in the guide bar. As the circuit breaker moves from the disconnect to the test position, contacts on the circuit breaker mate with contacts on the slide member. Concurrently, a rigid tongue member engages the slide member and forces the arms out of the slots, thus releasing the lock. The friction between the contacts and between the tongue member and arms allows the slide member to move back and forth along the guide bar with the circuit device. When the circuit device moves back to the test and disconnect positions a stop device prevents the travel of the slide block, overcomes the friction between the slide block and the circuit device, and frees the circuit device of the secondary connection. Tempco et al. overcame many of the problems experienced by earlier patents. Nonetheless, if the sliding block dislodged from the locked position, the circuit breaker (via the rigid tongue) could still engage the slide member. Moreover, a misaligned circuit device could still release the slide member from its locked position. In such cases the secondary contacts might not mate until the circuit device reached the connect position. Additionally, when the circuit breaker is moved from the connect position toward the test position, only the friction provides the force to drag the slide member back to the locked position. This friction could be overcome at an undesirable point along the guide bar. Thus, there is a need for an improved automatic interlocking mechanism for use as a secondary disconnect mechanism that ensures proper alignment of the secondary contacts and ensures engagement and disengagement of the secondary contacts only at the proper locations along the guide bar.

SUMMARY OF THE INVENTION

The present invention is directed to an automatic interlocking mechanism for use in aligning a removable element such as a circuit device with an enclosure wherein the circuit device is movable into and out of the enclosure among three distinct positions (hereinafter disconnect, test and connect positions). According to the present invention, the automatic interlocking mechanism comprises a guide bar mounted in the enclosure and positioned thereon so that it extends substantially parallel to the direction of movement of the circuit device into and out of the enclosure. Although in the preferred embodiment the guide bar is mounted on the enclosure, the guide bar could be mounted on the removable element with all other elements of the invention being adjusted accordingly.

The present invention further comprises a slide block slidably mounted on the guide bar and means for locking the slide block in place on the guide bar at a point corresponding to the test position of the circuit device. Means that cooperate with the locking means are provided for releasing the slide block from its locked position when the circuit device reaches the test position from the disconnect position, and for enabling the slide block to slide along the guide bar as the circuit device moves between the test and connect positions.

Further, latching means are provided that cause the slide block to latch on to the circuit device only when the slide block and circuit device engage at a position on the guide bar corresponding to the circuit device test position. If the slide block is not in this position the latching means prevent the circuit device from engaging the slide block.

One of a pair of mating secondary contact members is coupled to the slide block, while the other secondary contact member is coupled to the circuit device. The mating secondary contact members are disposed relative to each other such that when the slide block is in its locked position on the guide bar, the secondary contact members will engage as the circuit device moves from the disconnect position to the test position. In the preferred embodiment, wherein the guide bar is mounted on the enclosure, the other contact member is coupled to the circuit device.

Preferably, the guide bar has a slot formed therein proximate to the point corresponding to the test position of the circuit device, and the locking means comprises at least one trigger pivotally mounted on the slide block and adapted to pivot into the slot thereby locking the slide block to the guide bar. An arm, rotationally mounted on the slide block, is biased to push the trigger into the guide bar slot and prevent the trigger from pivoting. The slide bar will thus be locked onto the guide bar until the arm is rotated away from the trigger. One or more springs may be employed to bias the arm toward the trigger.

According to the preferred embodiment, the slide block releasing means preferably comprises a rigid mating connector member coupled to the circuit device and adapted to engage the arm and to rotate the arm away from the trigger when the circuit device reaches the test position from the disconnect position. Also according to the preferred embodiment, the latching means comprises the rigid mating connector having a slot therein so that the trigger pivots into the mating connector slot when the releasing means causes the trigger to pivot out of the guide bar slot.

According to another aspect of the present invention, when the circuit device moves back to the test position from the connect position and on to the disconnect position the slide bar is automatically released. The rigid mating connector engages the trigger and drags the slide member back along the guide bar. When the slide member reaches the lock position, such that the trigger aligns with the guide bar slot, the trigger pivots back into the guide bar slot and out of the mating connector slot. As a result, the slide bar cannot travel past the locked position and the secondary contact members automatically disengage.

As more fully explained hereinafter, the secondary disconnect mechanism of the present invention enables the mating secondary contact members to engage automatically as the circuit device moves from the disconnect position to the test position, to remain engaged and move with the circuit device (via the slide block) as the circuit device moves between the test position and the connect position, and to disengage automatically as the circuit device moves past the test position back toward the disconnect position. Although it is preferable to mount the guide bar and slide block to the enclosure while fixedly attaching the mating connector to the circuit device, the opposite arrangement may be employed wherein the guide bar and slide block are mounted on the circuit device and the mating connector is fixedly mounted on the enclosure. Furthermore, although the secondary disconnect mechanism of the present invention is particularly well suited for use with removable circuit breakers, the secondary disconnect mechanism of the present invention may be employed with any removable element wherein the positive alignment and latching features are desirable.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 2A is an isometric top view of the preferred embodiment of the automatic interlocking mechanism in the position corresponding to the disconnect position of the circuit device;

FIG. 2B is an isometric top view of the preferred embodiment of the automatic interlocking mechanism in the position corresponding to the test position of the circuit device;

FIGS. 3A, 3B, 4A; 4B are cutaway isometric views of the preferred embodiment of the automatic interlocking mechanism as it moves from the disconnect position into the test position illustrating the latching of the trigger to the mating connector.

DETAILED DESCRIPTION OF THE PREFERRED EMBODIMENT

Figure 1:
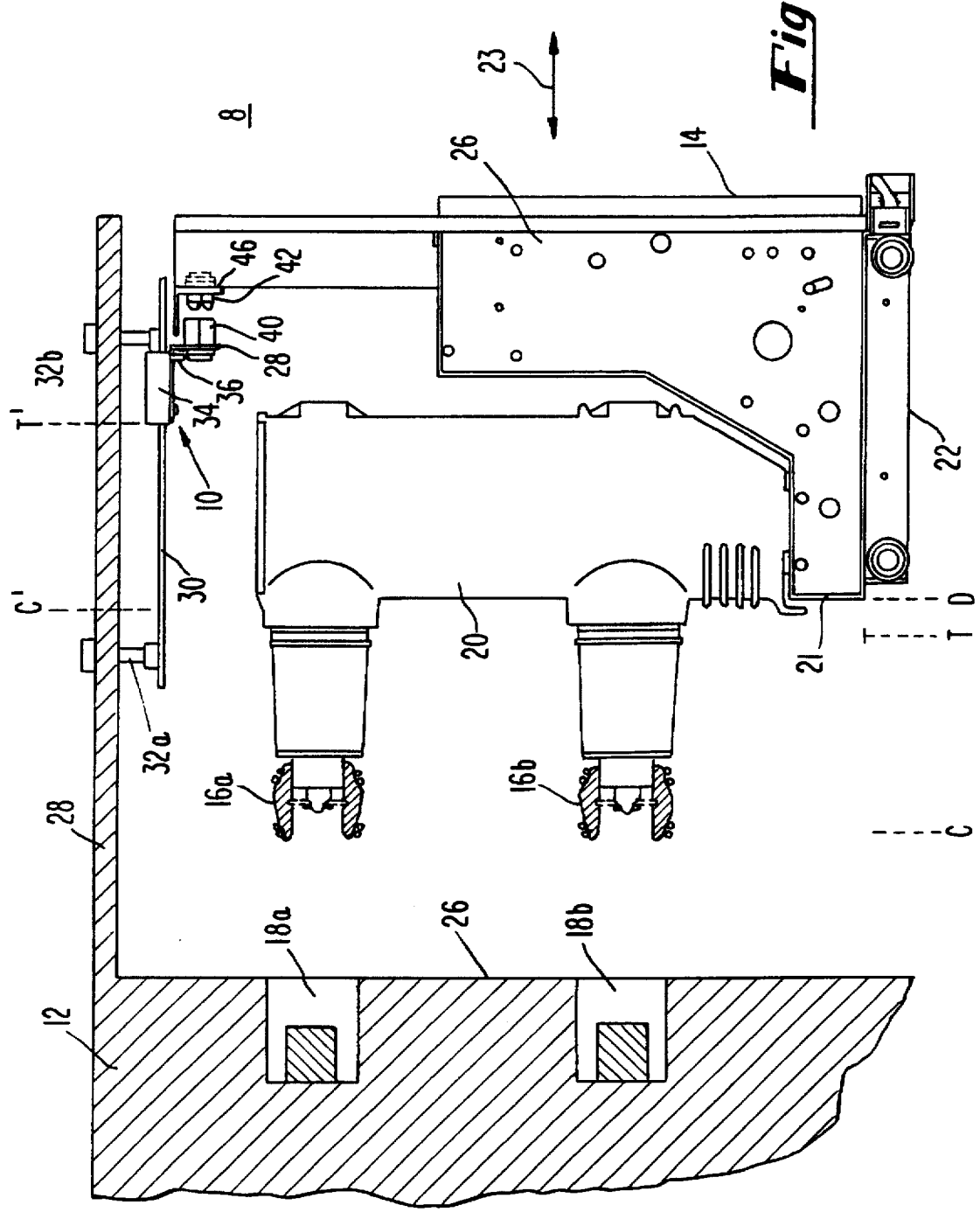
FIG. 1 is a cutaway side view of an exemplary switchgear apparatus employing a secondary disconnect mechanism in accordance with the present invention.

Referring now to the drawings wherein like numerals indicate like elements throughout, FIG. 1 depicts an exemplary switchgear apparatus 8 employing a secondary disconnect mechanism 10 in accordance with a preferred embodiment of the present invention. As shown, the exemplary switchgear apparatus 8 comprises an enclosure 12 and a removable circuit device 14, which in the present example comprises a circuit breaker having first and second primary contacts 16a and 16b. Mating primary contacts 18a and 18b are provide on a rear wall 26 of the enclosure 12. A racking mechanism 22 facilitates movement of the circuit breaker 14 into and out of the enclosure 12 between disconnect (D), test (T) and connect (C) positions, which are indicated in FIG. 1 with reference to a forward edge 21 of the circuit breaker 14. Arrows 23 indicate the direction of movement of the circuit breaker 14 into and out of the enclosure 12. The circuit breaker 14 further comprises a pole assembly 20, which contains a pair of interrupter switches (not shown), and a housing 26 that contains auxiliary devices and control circuitry (not shown). As described hereinafter in greater detail, power is supplied to the auxiliary devices and control circuitry through a pair of mating secondary contact members 40 and 42, which form part of the automatic secondary disconnect mechanism 10 of the present invention. FIG. 1 shows the circuit breaker 14 in the disconnect (D) position wherein both the primary contacts 16, 18 and secondary contacts 40, 42 are disengaged. Although the secondary disconnect mechanism 10 of the present invention is illustrated in FIG. 1 in connection with a removable circuit breaker, it is understood that the secondary disconnect mechanism of the present invention may be employed with any removable circuit device equipped with secondary contact members.

Figure 2:
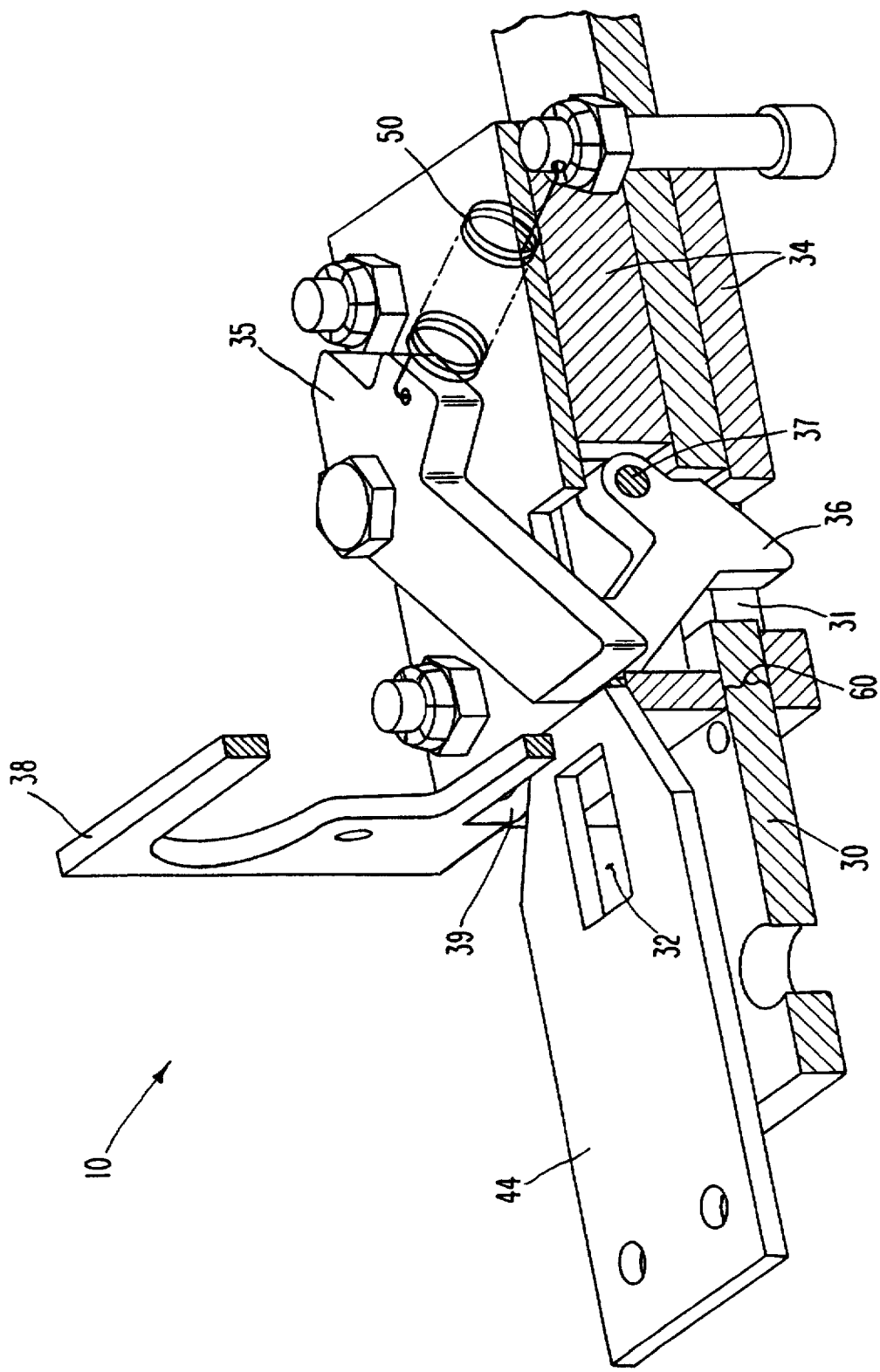
FIG. 2 cutaway isometric side view of the preferred embodiment of the automatic interlocking mechanism in the position corresponding to the disconnect position of the circuit device.

Referring to FIG. 2, a preferred embodiment of the automatic interlocking mechanism 10 of the present invention is shown. According to the preferred embodiment, the automatic interlocking mechanism comprises a guide bar 30 mounted to the enclosure 12 so that it extends substantially parallel to the direction of movement 23 of the circuit breaker 20 into and out of the enclosure 12. In the exemplary switchgear apparatus 8 of FIG. 1, the guide bar 30 is mounted at opposite ends to an outer wall 28 of the enclosure 12 using a pair of stand-offs and associated mounting hardware 32a, 32b. A slide block 34 is slidably mounted on the guide bar and operable to slide back and forth lengthwise of the guide bar 30. In the preferred embodiment, the slide block 34 is mounted to the guide bar 30 via an opening 60 that extends lengthwise through the center of the slide block 34.

The automatic interlocking mechanism 10 further comprises means for locking the slide block in place on the guide bar 30 at a point (T') corresponding to the test position (T) of the circuit device 14. According to the preferred embodiment, the locking means comprises at least one slot 31 formed on the guide bar 30 and at least one trigger 36 pivotally mounted on the slide block 34 and adapted to pivot into and engage the guide bar slot 31, thereby locking the slide block 34 to the guide bar 30 at point (T') which, as will become evident hereinafter, corresponds to the test position (T) of the circuit device 14. As described hereinafter in greater detail, the trigger 36 pivots about a shaft 37 disposed in an upper portion of the slide block 34. The trigger 36 is urged and locked into the guide bar slot 31 by an arm 35 rotationally mounted to the top of the slide block 34. Preferably, a spring 50 is provided to bias the arm 35 toward the trigger 36 so that the trigger 36 is urged into the guide bar slot 31 when the slide block 34 is positioned at T' and the circuit device is in the disconnect position (D).

The automatic interlocking mechanism 10 further comprises means for releasing the slide block 34 from its locked position T' on the guide bar 30 when the circuit device 14 reaches the test position (T) from the disconnect position (D), and for maintaining its release to enable the slide block 34 to slide freely along the guide bar 30 as the circuit device 14 moves between the test (T) and connect (C) positions. In the preferred embodiment, wherein the locking means comprises a slot 31, a pivotally mounted trigger 36, and a rotationally mounted arm 35, the releasing means comprises a rigid mating connector 44 that has a slot 32 formed therein and is fixedly attached to the circuit device 14, the mating connector 44 is adapted to engage the arm 35 and to rotate the arm 35 away from the trigger 36 when the circuit device 44 reaches the test position (T). As can be appreciated, once the arm 35 is rotated away from the trigger 36, the slide block 34 is free to slide along the guide rail 30. Sliding the slide block 34 toward the position corresponding to the connect position of the circuit device while the arm 35 is so disposed forces the trigger 36 to pivot out of the guide bar slot 31. Simultaneously, the latching means operate to latch the slide block 34 to the mating connector 44 when the circuit device 14 is moved to the test position. As stated above, when the arm 35 is rotated away from the trigger 36 by the mating connector 44, the trigger 36 pivots out of the guide bar slot 31. The trigger 36 thus pivots up through the mating connector slot 32 and latches the mating connector 44 to the slide block 34.

As mentioned previously, a pair of mating secondary contact members 40 and 42, through which power is supplied to the control circuitry on the circuit breaker 14, are coupled to the slide member 34 and circuit breaker 14, respectively. According to the preferred embodiment, the secondary contact member 40 is coupled to the slide block 34 using a right-angle mounting bracket 38. Mounting bracket 38 may be fixedly attached to the slide block 34 using any suitable hardware. Alternatively, bracket 38 may be integrally formed with the slide block 34. The other mating secondary contact member 42 is coupled to the circuit device 14 via bracket 46. As explained hereinafter, the respective contact members 40, 42 are disposed relative to each other (via the respective mounting brackets 38, 46) such that, when the slide block 34 is locked to the guide bar at position T', the contact members 40, 42 will fully engage by the time the circuit breaker 14 reaches the test position T. In this respect, the locked position of the slide block 34 at point T' is said to "correspond" to the test position (T) of the circuit device 14.

Preferably, the mounting hardware used to mount the contact member 42 to the bracket 46 prevents movement of the contact member 42 (relative to the circuit device 14) in the direction of movement 23 of the circuit device 14, but allows some movement of the contact member 42 in directions perpendicular to the direction of movement of the circuit device 14. Allowing the contact member 42 to move or "float" perpendicular to the direction of movement of the circuit device 14 compensates for any misalignment of the mating contact members 40, 42 as they begin to engage near the test position. Generally, only a small degree of movement is needed to compensate for any such misalignment.

As described hereinafter, as the circuit device 14 moves from the disconnect position (D) toward the test position (T), the mating connector 44 passes through an opening 39 in the mounting bracket 38 and eventually engages the arm 35. Preferably, the guide bar 30, arm 35, trigger 36, mating connector 44 and brackets 38 and 46 are formed of metal. The slide bar 34 is preferably formed of a plastic material.

Figure 3A:
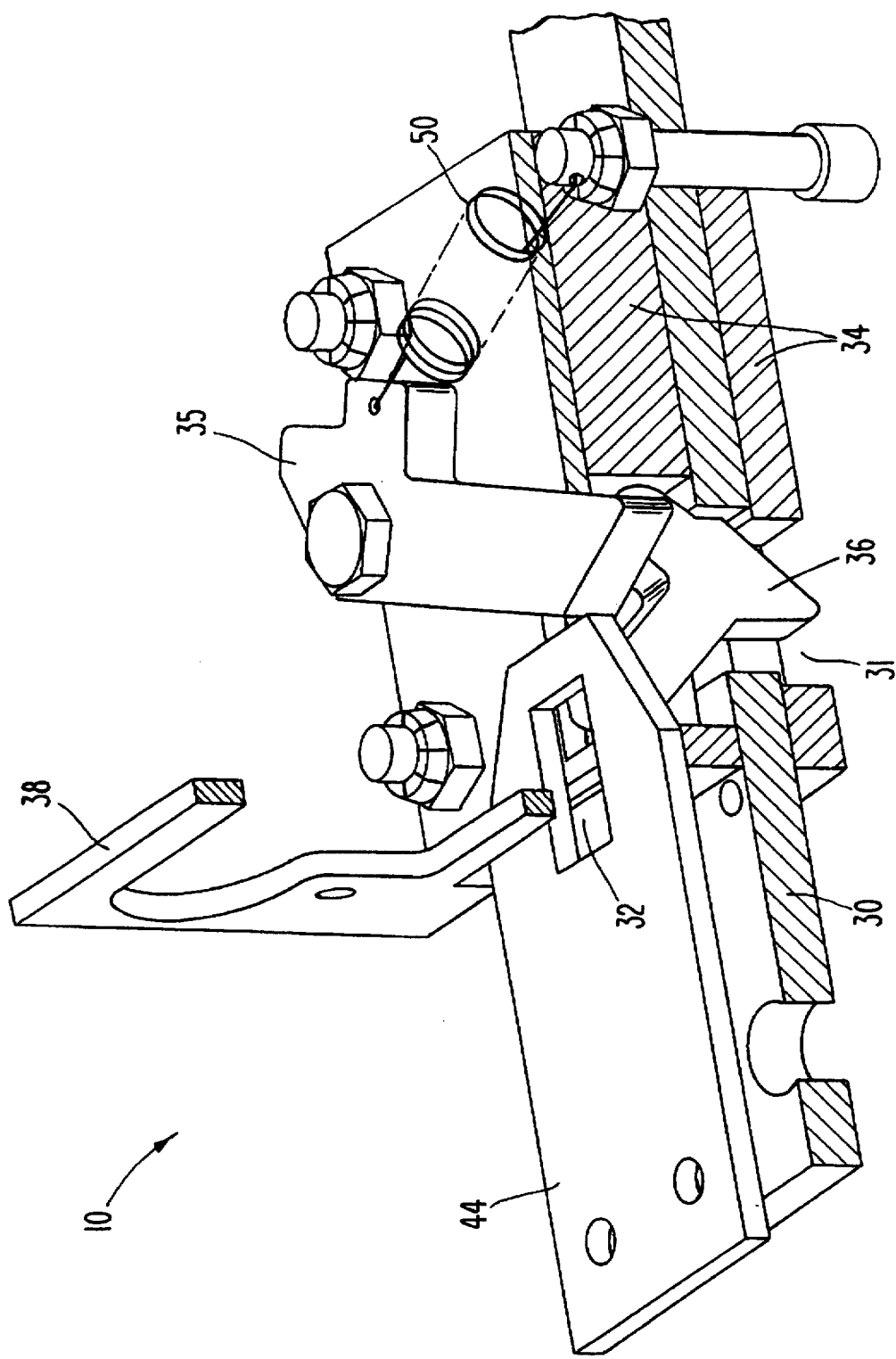

FIGS. 2, 3A, 3B, 4A & 4B together illustrate the latching of the trigger 36 to the mating connector 44. As illustrated in FIG. 2, the automatic interlocking mechanism 10 is in the locked position when the mating connector 44 is in the position corresponding to the disconnect position of the circuit device 14. As FIG. 3B illustrates, when the mating connector 44 engages the arm 35, the trigger 36 is forced to impinge upon the guide bar 30. As FIG. 3B illustrates, the trigger 36 thus begins to pivot toward the mating connector slot 32 and out of the guide bar slot 31.

Figure 4A:
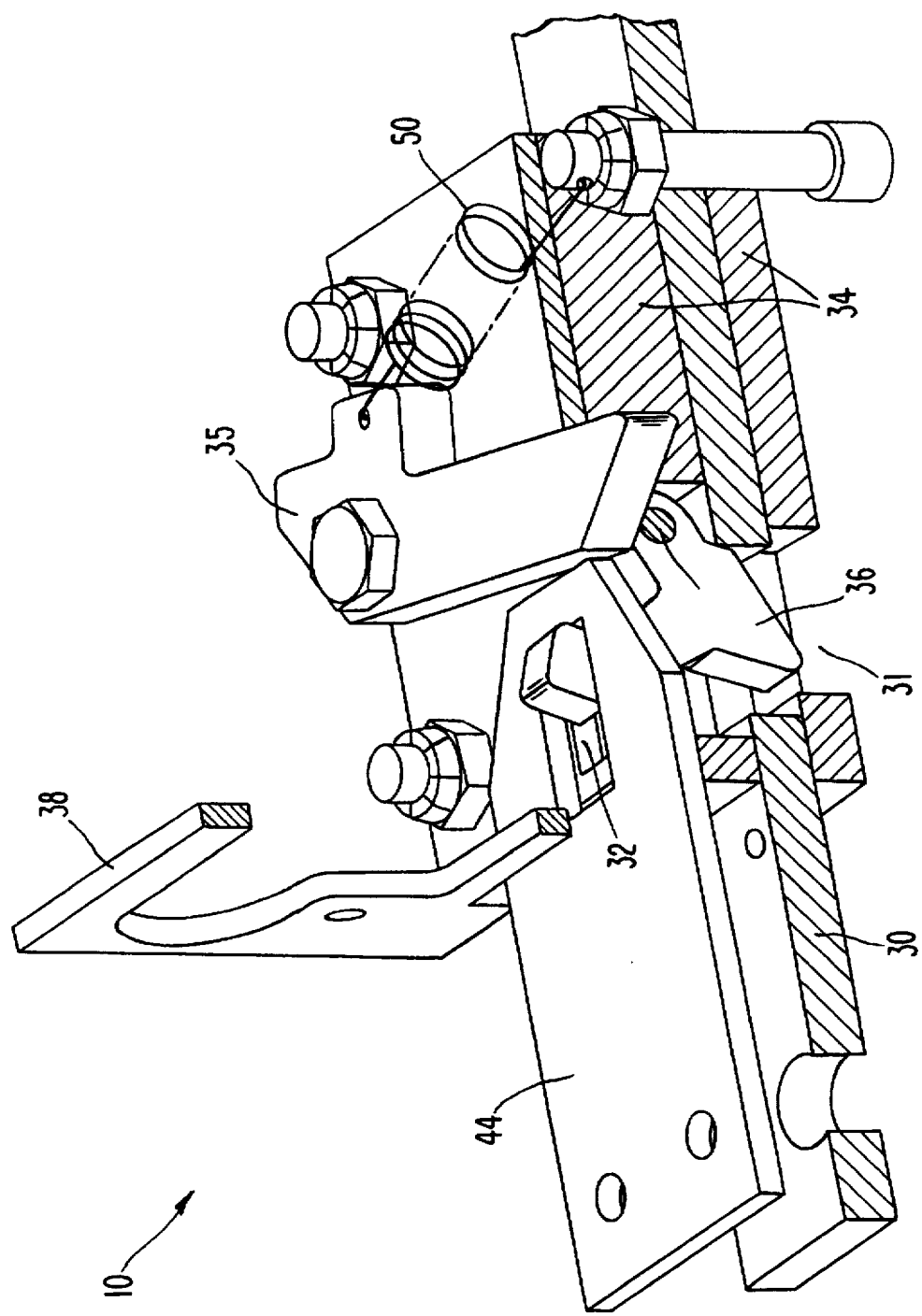
Figure 4B:
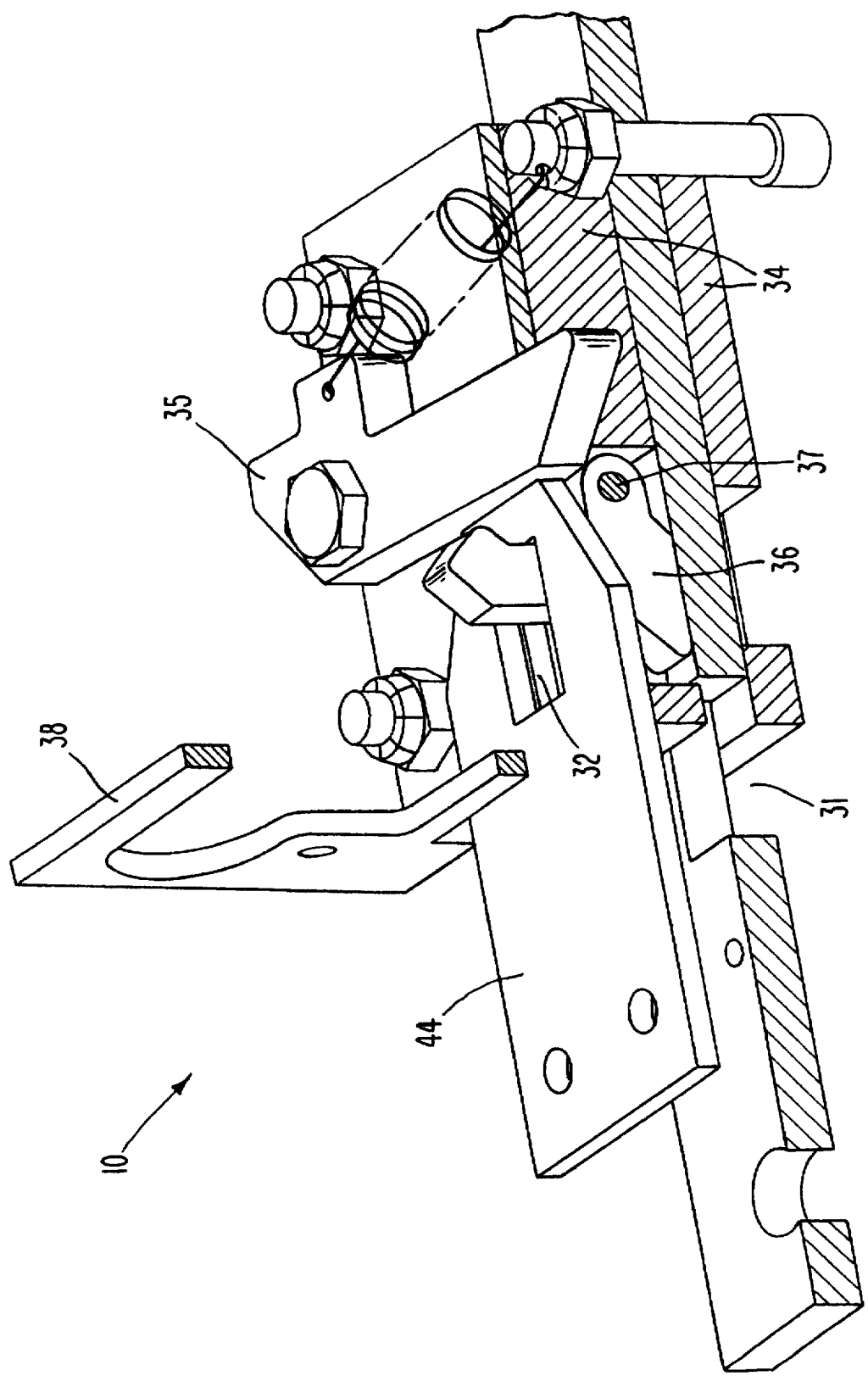

FIG. 4A illustrates the trigger 36 continuing up through the mating connector slot 32 as the mating connector 44 further engages and rotates the arm 35 away from the trigger 36. FIG. 4B illustrates the fully latched position of the trigger 36 with the mating connector 44. The trigger 36 has now fully pivoted out of the guide bar slot 31 and the sliding block 34 has begun to traverse the guide bar 30.

The disengagement of the mating connector 44 and the slide block 34 is accomplished by reversing the engagement sequence. In such a disengagement sequence, the mating connector 44 would drag the slide block 34 toward a point corresponding to the disconnect position of the circuit device 14. Because the trigger 36 remains interlocked with the mating connector 44, the slide block 34 will travel with the circuit device 14 as the mating connector 44 pulls against the trigger 36. When the trigger 36 reaches the guide bar slot 31, the force of the mating connector 44 against the top of the trigger 36 will counter pivot the trigger 36 back into the guide bar slot 31 and out of the mating connector slot 32. The mating connector 44 will thus de-latch from the slide block 34 as the circuit device 14 continues to travel to the disconnect position and the trigger 36 impinges upon the guide bar slot 31. As the mating connector 44 disengages from the slide block 34, the arm 35 rotates back toward the trigger 36 locking the trigger 36 and, consequently, the slide block 34, to the guide bar 30.

The trigger 36 will then act as a lock, locking the slide block 34 to the guide bar 30, as well as a stop, stopping the slide block 34 from continuing past the point corresponding to the test position of the circuit device 14. As should be appreciated, the interaction of the trigger 36 with the guide bar and mating connector slots 31, 32 prevents the mating connector 44 and the slide block 34 from engaging or disengaging unless the trigger 36 is positioned within the guide bar slot 31.

Figure 2C:
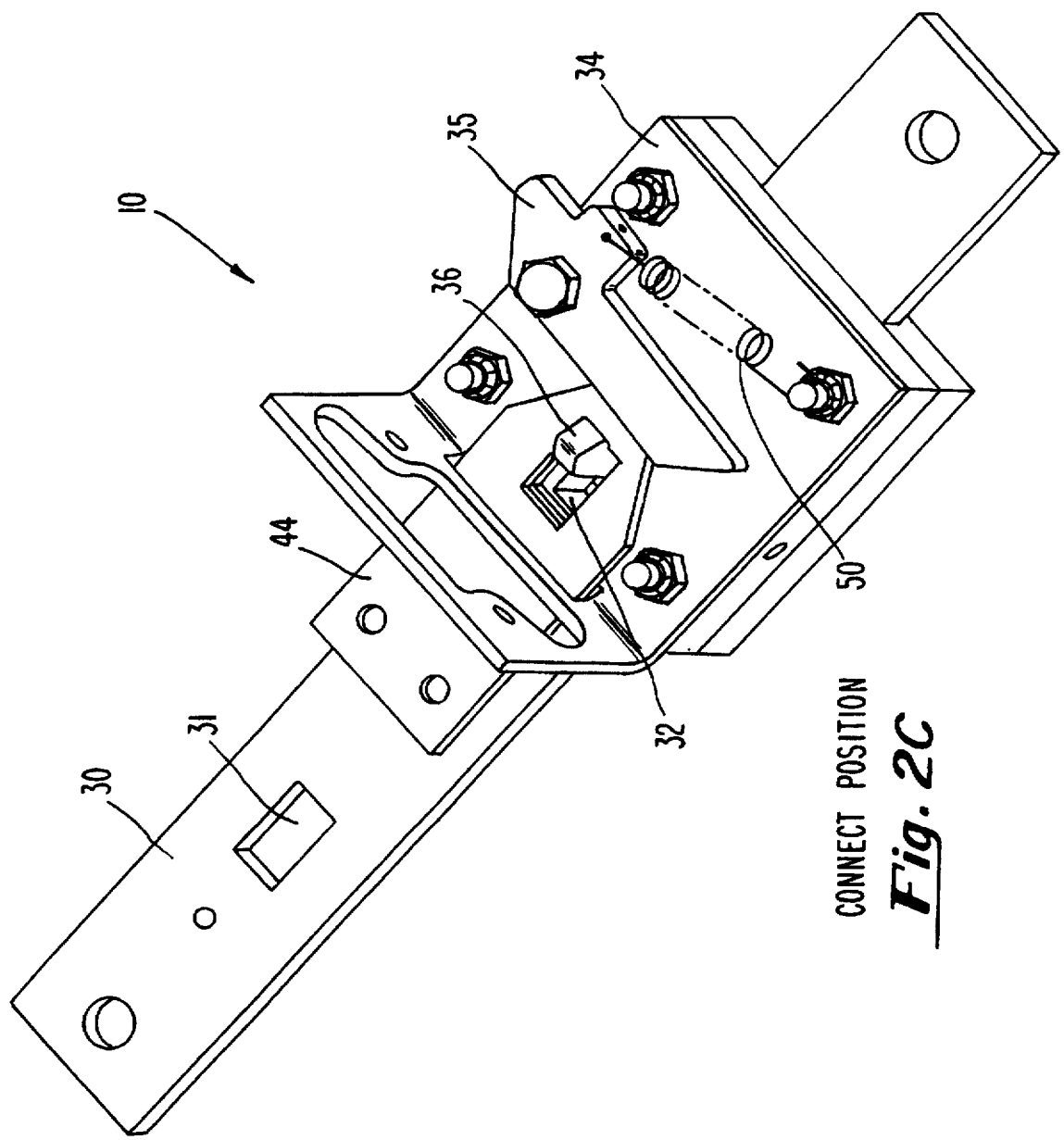
FIG. 2C is an isometric top view of the preferred embodiment of the automatic interlocking mechanism in the position corresponding to the connect position of the circuit device.

To further demonstrate the invention, FIGS. 2A, 2B and 2C show the disposition of the slide block 34 relative to the mating connector 44 at the three distinct positions of the circuit device 14 (i.e. disconnect, test and connect). FIG. 2A shows a top view of the slide block 34 at the initial locked position on the guide bar 30. The arm 35 is rotated over the trigger 36. In such a position, the slide block 34 is not free to traverse the guide bar 30. In FIG. 2B the mating connector 44 has reached a point corresponding to the test position of the circuit device 14. As the drawing indicates, the mating connector 44 has fully engaged the slide block 34 and the trigger 36 has latched to the mating connector 44. FIG. 2C illustrates that the slide block 34 can traverse the guide bar 30 when the mating connector 44 has latched to the slide block 34 and moved away from the guide bar slot 31.

The present invention may be embodied in other specific forms without departing from the spirit or essential attributes thereof, and accordingly, reference should be made to the appended claims, rather than to the foregoing specification, as indicating the scope of the invention.

What is claimed is:

1. An automatic interlocking mechanism for aligning a removable element to a stationary enclosure wherein the removable element is movable into and out of the stationary enclosure among first, second and third positions, said automatic interlocking mechanism comprising:

a guide bar fixedly attached to one of the stationary enclosure and the removable element, said guide bar extending substantially parallel to the direction of movement of the removable element into and out of the stationary enclosure;

a slide block slidably mounted on said guide bar;

first means for locking said slide block in place on said guide bar at a first position, for releasing said slide block from its locked position when the removable element is moved to the second position from the first position so that said slide block can move relative to said guide bar when the removable element moves between the second and third positions, for latching the removable element to said slide block when the removable element is moved to the second position, and for preventing the removable element from engaging the slide block at a point other than the second position.

2. An automatic interlocking mechanism as in claim 1 wherein said guide bar has a slot formed therein proximate to a point corresponding to the second position of the removable element, and wherein said first means comprises:

a trigger pivotally attached to said slide block; and, second means for urging said trigger into said guide bar slot when the removable element is in the first position and the sliding block is at said point corresponding to the second position of the removable element.

3. An automatic interlocking mechanism as in claim 2 wherein said second means comprises an arm rotationally mounted to said slide block which urges and locks said trigger into said guide bar slot when the removable element is in the first position for preventing said slide block from moving relative to said guide bar.

4. An automatic interlocking mechanism as in claim 3 further comprising a spring that biases said arm toward said trigger.

5. An automatic interlocking mechanism as in claim 3 wherein said means further comprises a mating connector attached to said other one of the stationary enclosure and the removable element which engages and rotates said arm away from said trigger and enables said trigger to pivot out of said guide bar slot when the removable element reaches the second position from the first position.

6. An automatic interlocking mechanism as in claim 5 wherein said mating connector has a slot formed therein which receives said trigger when said trigger pivots out of said guide bar slot and into said mating connector slot when the removable element is moved from the first position to the second position thereby latching the removable element to said slide block, and which releases said trigger when said trigger pivots out of said mating connector slot and into said guide bar slot when the removable element moves from the second position to the first position thereby de-latching the removable element from said slide block.

7. An automatic interlocking mechanism for aligning a removable element to a stationary enclosure wherein the removable element is movable into and out of the stationary enclosure between first, second and third positions, said automatic interlocking mechanism comprising:

a guide bar fixedly attached to one of the stationary enclosure and the removable element, said guide bar extending substantially parallel to the direction of movement of the removable element into and out of the stationary enclosure;

a slide block slidably mounted on said guide bar;

first means for locking said slide block in place on said guide bar at a point corresponding to the second position of the removable element;

second means cooperating with said first means for releasing said slide block from its locked position, latching to said slide block when the removable element is moved to the second position from the first position and preventing the removable element from engaging the slide block at a point other than the second position.

8. An automatic interlocking mechanism as in claim 7 wherein said guide bar has a slot formed therein proximate to said point corresponding to the second position of the removable element, and wherein said first means comprises:

a trigger pivotally attached to said slide block; and, means for urging said trigger into said guide bar slot when the removable element is in the first position.

9. An automatic interlocking mechanism as in claim 8 wherein said means for urging comprises an arm rotationally mounted to said slide block which urges said trigger into said guide bar slot when the removable element is in the first position for preventing said slide block from moving relative to said guide bar.

10. An automatic interlocking mechanism as in claim 9 further comprising a spring that biases said arm toward said trigger.

11. An automatic interlocking mechanism as in claim 9 wherein said second means comprises a mating connector having a slot formed therein which engages and rotates said arm away from said trigger, and urges said trigger against said guide bar slot, thereby forcing said trigger to pivot out of said guide bar slot and into said mating connector slot for latching the removable element to said slide block, for releasing said slide block from the locked position, and for enabling the slide block to traverse said guide bar when the removable element moves to the second position from the first position.

12. An automatic interlocking mechanism for aligning a removable element to a stationary enclosure wherein the removable element is movable into and out of the stationary enclosure between first, second and third positions, said automatic interlocking mechanism comprising:

a guide bar fixedly attached to the stationary enclosure, said guide bar extending substantially parallel to the direction of movement of the removable element into and out of the stationary enclosure, said guide bar having at least one slot formed therein proximate to a point corresponding to the second position of the removable element;

a slide block slidably mounted on said guide bar;

a rigid mating connector coupled to the removable element and adapted to engage said slide block, said mating connector having at least one slot formed therein;

at least one trigger pivotally mounted on said slide block and operable to pivot into said slot formed on said guide bar when said slide block is positioned at said point corresponding to the second position of the removable element and said mating connector is disengaged from said slide block, said trigger operable to pivot out of said slot formed on said guide bar and into said slot formed on said mating connector when said mating connector is engaged in said slide block, thereby enabling said slide block to traverse said guide bar; and, an arm rotationally mounted on said slide block and operable to urge and lock said trigger into said slot formed on said guide bar when said mating connector is disengaged from said slide block, and operable to rotate away from said trigger when said mating connector is engaged in said slide block, thereby enabling said trigger to pivot.

13. An automatic interlocking mechanism as in claim 12 further comprising a spring that biases said arm toward said trigger.

14. An automatic interlocking mechanism for an electrical switchgear apparatus having an enclosure and a removable circuit device wherein the circuit device is movable into and out of the enclosure between disconnect, test and connect positions, said automatic interlocking mechanism comprising:

a guide bar mounted on the enclosure and extending substantially parallel to the direction of movement of the circuit device into and out of the enclosure;

a slide block slidably mounted on said guide bar and being slidable back and forth lengthwise of said guide bar;

locking means disposed on said slide block for locking said slide block in place on said guide bar at a point corresponding to the test position of said circuit device;

a mating connector disposed on the circuit device, an end of said mating connector engaging said locking means to release said slide block from its locked position, said mating connector having a slot formed therein for coupling with said locking means when the circuit device moves to the test position from the disconnect position and enabling said slide block to slide along said guide bar as the circuit device moves between the test and connect positions such that the circuit device is prevented from engaging said slide block at a point other than said point corresponding to the test position of the circuit device.

15. An automatic interlocking mechanism as recited in claim 14 further comprising a pair of mating secondary contact members, one of said secondary contact members being coupled to said slide block, the other of said secondary contact members being coupled to the circuit device, said mating secondary contact members being disposed relative to each other such that when said slide block is in its locked position, the secondary contact members will engage as the circuit device moves from the disconnect position to the test position.

16. An automatic interlocking mechanism as recited in claim 14 wherein said guide bar has a slot formed therein proximate to said point corresponding to the test position of the circuit device, and wherein said locking means comprises: at least one trigger pivotally mounted on said slide block and adapted to pivot into said slot thereby locking said slide block to said guide bar at said point; and, means for urging said trigger into said guide bar slot.

17. An automatic interlocking mechanism as in claim 16 wherein said means for urging comprises an arm rotationally mounted to said slide block pushing said trigger into said guide bar slot when the removable element is in the test position, and locking said trigger into said guide bar slot, thereby preventing said slide block from moving relative to said guide bar.

18. An automatic interlocking mechanism as recited in claim 17 further comprising a spring that biases said arm toward said trigger.

19. An automatic secondary disconnect mechanism as recited in claim 17 wherein said releasing means comprises a rigid mating connector coupled to the circuit device having a slot formed therein, said rigid mating connector having an end for engaging said slide block, rotating said arm away from said trigger, and urging said trigger against said guide bar slot such that said trigger can pivot out of said guide bar slot and into said mating connector slot when the circuit device reaches the test position from the disconnect position.

20. An automatic interlocking mechanism for an electrical switchgear apparatus having an enclosure and a removable circuit breaker wherein the circuit breaker of movable into and out of the enclosure between disconnect, test and connect positions, said automatic secondary disconnect mechanism comprising:

a guide bar mounted on the enclosure and extending substantially parallel to the direction of movement of the circuit breaker into and out of the enclosure, said guide bar having at least one slot formed therein proximate to a point corresponding to the test position of said circuit breaker;

a slide block slidably mounted on said guide bar and being slidable back and forth lengthwise of said guide bar;

at least one trigger pivotally mounted on said slide block and operable to pivot into the slot formed on the guide bar when the slide block is positioned at said point corresponding to the test position of said circuit breaker, said point thereby defining a locked position of said slide block;

a rigid mating connector coupled to the circuit breaker having a slot formed therein, said mating connector having an end for urging said trigger to pivot out of said guide bar slot and into said mating connector slot when the circuit breaker reaches the test position from the disconnect position, thereby enabling said slide block to slide along said guide bar and preventing said slide block from engaging said mating connector at a point on said guide bar other than said point corresponding to said test position; and a pair of mating secondary contact members, one of said secondary contact members being coupled to said slide block, the other of said secondary contact members being coupled to the circuit breaker, said mating secondary contact members being disposed relative to each other such that when the slide block is in its locked position, the secondary contact members will engage as the circuit breaker moves from the disconnect position to the test position.

21. An automatic interlocking mechanism as recited in claim 20 further comprising an arm rotationally mounted to said slide block for urging and locking said trigger into said guide bar slot when said slide block is at said point corresponding to said locked position of the slide block and said mating connector is disengaged from said sliding block.

22. An automatic interlocking mechanism as recited in claim 21 further comprising a spring coupled to said arm and operable to bias said arm toward said trigger.

* * * * *